United States Patent
Shahana

(10) Patent No.: US 12,091,135 B2
(45) Date of Patent: Sep. 17, 2024

(54) CONTROL DEVICE FOR HUMAN-POWERED VEHICLE

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/366,383

(22) Filed: Aug. 7, 2023

(65) Prior Publication Data

US 2024/0083542 A1    Mar. 14, 2024

(30) Foreign Application Priority Data

Sep. 9, 2022    (JP) .................................. 2022-144035

(51) Int. Cl.
     *B62M 9/122*      (2010.01)
     *B62M 9/124*      (2010.01)

(52) U.S. Cl.
     CPC ............ *B62M 9/122* (2013.01); *B62M 9/124* (2013.01)

(58) Field of Classification Search
     CPC ....... B62M 9/123; B62M 9/122; B62M 9/124
     See application file for complete search history.

(56) References Cited

U.S. PATENT DOCUMENTS

| | | | | |
|---|---|---|---|---|
| 2015/0329161 | A1* | 11/2015 | Fujii ......................... | B62J 3/14 |
| | | | | 701/64 |
| 2016/0375958 | A1* | 12/2016 | Hashimoto ............ | B62M 9/123 |
| | | | | 701/58 |
| 2017/0158285 | A1* | 6/2017 | Tachibana .............. | B62M 9/122 |
| 2018/0111661 | A1* | 4/2018 | Wesling ................. | B62M 9/122 |
| 2020/0317289 | A1* | 10/2020 | Honda ................... | B62K 23/06 |

FOREIGN PATENT DOCUMENTS

| | | |
|---|---|---|
| JP | 2013-47085 A | 3/2013 |
| JP | 2014-151745 A | 8/2014 |

* cited by examiner

*Primary Examiner* — Justin Holmes
(74) *Attorney, Agent, or Firm* — Global IP Counselors, LLP

(57) ABSTRACT

A human-powered vehicle control device includes an electronic controller that controls a transmission device to shift a ratio of a rotational speed of a wheel to a rotational speed of a crank axle in stages. The controller controls the transmission device so that the transmission device performs a first shifting action that shifts the ratio by only one stage in a case where a shifting condition is satisfied. The transmission device is controlled by the electronic controller so that the transmission device performs a second shifting action that shifts the ratio by two or more stages in a case where the shifting condition is satisfied and a vehicle state of the human-powered vehicle is a predetermined state. The predetermined state includes a state in which a change amount of a parameter related to the vehicle state is a predetermined amount or greater.

19 Claims, 4 Drawing Sheets

CONTROL DEVICE FOR HUMAN-POWERED VEHICLE

CROSS-REFERENCE TO RELATED APPLICATIONS

This application claims priority to Japanese Patent Application No. 2022-144035, filed on Sep. 9, 2023. The entire disclosure of Japanese Patent Application No. 2022-144035 is hereby incorporated herein by reference.

BACKGROUND

Technical Field

The present disclosure generally relates to a control device for a human-powered vehicle.

Background Information

One example of a control device for a human-powered vehicle is disclosed in Japanese Laid-Open Patent Publication No. 2014-151745 (Patent Document 1). The control device of Patent Document 1 is configured to control a transmission device of the human-powered vehicle.

SUMMARY

One objective of the present disclosure is to provide a control device for a human-powered vehicle that controls a transmission device in a preferred manner.

A control device in accordance with a first aspect of the present disclosure is for a human-powered vehicle. The control device comprises an electronic controller configured to control a transmission device that shifts a ratio of a rotational speed of a wheel of a human-powered vehicle to a rotational speed of a crank axle of the human-powered vehicle in stages. The electronic controller is configured to control the transmission device so that the transmission device performs a first shifting action that shifts the ratio by only one stage in a case where a shifting condition is satisfied. The transmission device is configured to be controllable by the electronic controller so that the transmission device performs a second shifting action that shifts the ratio by two or more stages in a case where the shifting condition is satisfied and a vehicle state of the human-powered vehicle is a predetermined state. The predetermined state includes a state in which a change amount of a parameter related to the vehicle state of the human-powered vehicle is a predetermined amount or greater.

With the control device according to the first aspect, the transmission device is configured to be controllable so that the transmission device performs the second shifting action, which shifts the ratio by two or more stages, in a case where the change amount of the parameter related to the vehicle state of the human-powered vehicle is the predetermined amount or greater. This allows for quick shifting of the ratio by two or more stages. Thus, the electronic controller controls the transmission device in a preferred manner.

In accordance with a second aspect of the present disclosure, the control device according to the first aspect is configured so that the transmission device includes an external shifting device that moves a chain of the human-powered vehicle from one of a plurality of sprockets onto another one of the sprockets. The first shifting action includes a shifting action that moves the chain of the human-powered vehicle from a first one of the sprockets onto a second one of the sprockets that is adjacent to the first sprocket. The second shifting action includes a shifting action that moves the chain of the human-powered vehicle from a third one of the sprockets onto a fourth one of the sprockets that sandwiches another sprocket with the third sprocket.

With the control device according to the second aspect, the ratio is shifted by two or more stages more quickly in the second shifting action than in the first shifting action, which is performed multiple times.

A control device in accordance with a third aspect of the present disclosure is for a human-powered vehicle. The control device comprises an electronic controller configured to control a transmission device that shifts a ratio of a rotational speed of a wheel of a human-powered vehicle to a rotational speed of a crank axle of the human-powered vehicle in stages. The transmission device includes an external shifting device that moves a chain of the human-powered vehicle from one of a plurality of sprockets onto another one of the sprockets. The transmission device is configured to be controllable by the electronic controller so that the transmission device performs a first shifting action that shifts the ratio in a case where a shifting condition is satisfied and a predetermined condition is unsatisfied. The transmission device is configured to be controllable by the electronic controller so that the transmission device performs a second shifting action that shifts the ratio in a case where the shifting condition is satisfied and the predetermined condition is satisfied. The first shifting action includes a shifting action that moves the chain of the human-powered vehicle from a first one of the sprockets onto a second one of the sprockets that is adjacent to the first sprocket. The second shifting action includes a shifting action that moves the chain of the human-powered vehicle from a third one of the sprockets onto a fourth one of the sprockets that sandwiches another sprocket with the third sprocket.

With the control device according to the third aspect, the transmission device is configured to be controllable so that the transmission device performs the second shifting action, which shifts the ratio by two or more stages, in a case where the predetermined condition is satisfied. This allows for quick shifting of the ratio by two or more stages. Thus, the electronic controller controls the transmission device in a preferred manner.

In accordance with a fourth aspect of the present disclosure, the control device according to the third aspect is configured so that the predetermined condition includes a case where a vehicle state of the human-powered vehicle satisfies a predetermined state. The predetermined state includes a state in which a change amount of a parameter related to the vehicle state of the human-powered vehicle is a predetermined amount or greater.

With the control device according to the fourth aspect, in a case where the change amount of the parameter related to the vehicle state of the human-powered vehicle is the predetermined amount or greater, the second shifting action is performed so that the ratio is quickly shifted by two or more stages.

In accordance with a fifth aspect of the present disclosure, the control device according to any one of the first, second, and fourth aspects is configured so that the parameter includes an estimated rotational speed of the crank axle calculated from a vehicle speed and the ratio.

With the control device according to the fifth aspect, in a case where the change amount of the estimated rotational speed of the crank axle is the predetermined amount or greater, the second shifting action is performed so that the ratio is quickly shifted by two or more stages.

In accordance with a sixth aspect of the present disclosure, the control device according to any one of the first, second, and fourth aspects is configured so that the parameter includes the rotational speed of the crank axle.

With the control device according to the sixth aspect, in a case where the change amount of the rotational speed of the crank axle is the predetermined amount or greater, the second shifting action is performed so that the ratio is quickly shifted by two or more stages.

In accordance with a seventh aspect of the present disclosure, the control device according to any one of the first, second, and fourth to sixth aspects is configured so that the parameter includes a vehicle speed.

With the control device according to the seventh aspect, in a case where the change amount of the vehicle speed is the predetermined amount or greater, the second shifting action is performed so that the ratio is quickly shifted by two or more stages.

In accordance with an eighth aspect of the present disclosure, the control device according to any one of the first, second, and fourth to seventh aspects is configured so that the parameter includes a gradient of a road traveled by the human-powered vehicle.

With the control device according to the eighth aspect, in a case where the change amount of the gradient of the road traveled is the predetermined amount or greater, the second shifting action is performed so that the ratio is quickly shifted by two or more stages.

In accordance with a ninth aspect of the present disclosure, the control device according to any one of the first, second, and fourth to eighth aspects is configured so that the predetermined state includes a state in which a human driving force input to the human-powered vehicle is within a predetermined range.

With the control device according to the ninth aspect, in a case where human driving force input to the human-powered vehicle is within the predetermined range, the second shifting action is performed so that the ratio is quickly shifted by two or more stages.

In accordance with a tenth aspect of the present disclosure, the control device according to the ninth aspect is configured so that the predetermined state includes a state in which the human driving force is less than or equal to a first driving force and the shifting condition for increasing the ratio is satisfied.

With the control device according to the tenth aspect, in a case where human driving force is less than or equal to the first driving force and the shifting condition for increasing the ratio is satisfied, the second shifting action is performed so that the ratio is quickly shifted by two or more stages.

In accordance with an eleventh aspect of the present disclosure, the control device according to the tenth aspect is configured so that the predetermined state includes a case where the human driving force is less than or equal to the first driving force, an acceleration of the human-powered vehicle is greater than or equal to a first acceleration, and the shifting condition for increasing the ratio is satisfied.

With the control device according to the eleventh aspect, in a case where human driving force is less than or equal to the first driving force, acceleration of the human-powered vehicle is greater than or equal to the first acceleration, and the shifting condition for increasing the ratio is satisfied, the second shifting action is performed to quickly increase the ratio by two or more stages.

In accordance with a twelfth aspect of the present disclosure, the control device according to any one of the ninth to eleventh aspects is configured so that the predetermined state includes a case where the human driving force is greater than or equal to a second driving force and the shifting condition for decreasing the ratio is satisfied.

With the control device according to the twelfth aspect, in a case where human driving force is greater than or equal to the second driving force and the shifting condition for decreasing the ratio is satisfied, the second shifting action is performed to quickly decrease the ratio by two or more stages.

In accordance with a thirteenth aspect of the present disclosure, the control device according to the twelfth aspect is configured so that the predetermined state includes a case where the human driving force is greater than or equal to the second driving force, an acceleration of the human-powered vehicle is less than or equal to a second acceleration, and the shifting condition for decreasing the ratio is satisfied.

With the control device according to the thirteenth aspect, in a case where human driving force is greater than or equal to the second driving force, acceleration of the human-powered vehicle is less than or equal to the second acceleration, and the shifting condition for decreasing the ratio is satisfied, the second shifting action is performed to quickly decrease the ratio by two or more stages.

In accordance with a fourteenth aspect of the present disclosure, the control device according to any one of the first, second, and fourth to thirteenth aspects is configured so that the predetermined state includes a state in which a difference of a detected rotational speed obtained from an output of a detector that detects the rotational speed of the crank axle and an estimated rotational speed of the crank axle calculated from vehicle speed and the ratio is greater than or equal to a predetermined difference.

With the control device according to the fourteenth aspect, in a case where the difference of the detected rotational speed and the estimated rotational speed of the crank axle is greater than or equal to the predetermined difference, the ratio is quickly shifted by two or more stages.

In accordance with a fifteenth aspect of the present disclosure, the control device according to any one of the first, second, and fourth to fourteenth aspects is configured so that the predetermined state includes a state in which a rotated amount of the crank axle is less than or equal to a predetermined rotated amount.

With the control device according to the fifteenth aspect, in a case where the rotated amount of the crank axle is less than or equal to the predetermined rotated amount, the ratio is shifted quickly by two or more stages.

In accordance with a sixteenth aspect of the present disclosure, the control device according to any one of the first to fifteenth aspects is configured so that the shifting condition is related to at least one of a traveling state of the human-powered vehicle and a traveling environment of the human-powered vehicle.

The control device according to the sixteenth aspect controls the transmission device in a preferred manner in accordance with at least one of the traveling state of the human-powered vehicle and the traveling environment of the human-powered vehicle.

In accordance with a seventeenth aspect of the present disclosure, the control device according to any one of the first to sixteenth aspects is configured so that the shifting condition includes at least one of the rotational speed of the crank axle, the human driving force input to the human-powered vehicle, and a vehicle speed.

The control device according to the seventeenth aspect controls the transmission device in a preferred manner in accordance with at least one of the rotational speed of the crank axle, the human driving force, and the vehicle speed.

In accordance with an eighteenth aspect of the present disclosure, the control device according to any one of the first to seventeenth aspects is configured so that the shifting condition includes the rotational speed of the crank axle. The electronic controller controls the transmission device to increase the ratio in a case where the rotational speed of the crank axle is greater than an upper limit threshold value. The electronic controller controls the transmission device to decrease the ratio in a case where the rotational speed of the crank axle is less than a lower limit threshold value.

The control device according to the eighteenth aspect controls the transmission device so that the ratio is increased in a case where the rotational speed of the crank axle is greater than the upper limit threshold value, and so that the ratio is decreased in a case where the rotational speed of the crank axle is less than the lower limit threshold value.

In accordance with a nineteenth aspect of the present disclosure, the control device according to any one of the second to fourth aspects is configured so that the second shifting action includes a shifting action that controls the transmission device so that an estimated rotational speed of the crank axle calculated from a vehicle speed and the ratio is within a predetermined range.

The control device according to the nineteenth aspect controls the transmission device so that the estimated rotational speed of the crank axle quickly becomes within the predetermined range in the second shifting action.

The control device for a human-powered vehicle according to the present disclosure controls the transmission device in a preferred manner.

BRIEF DESCRIPTION OF THE DRAWINGS

Referring now to the attached drawings which form a part of this original disclosure.

DETAILED DESCRIPTION

Figure 1:
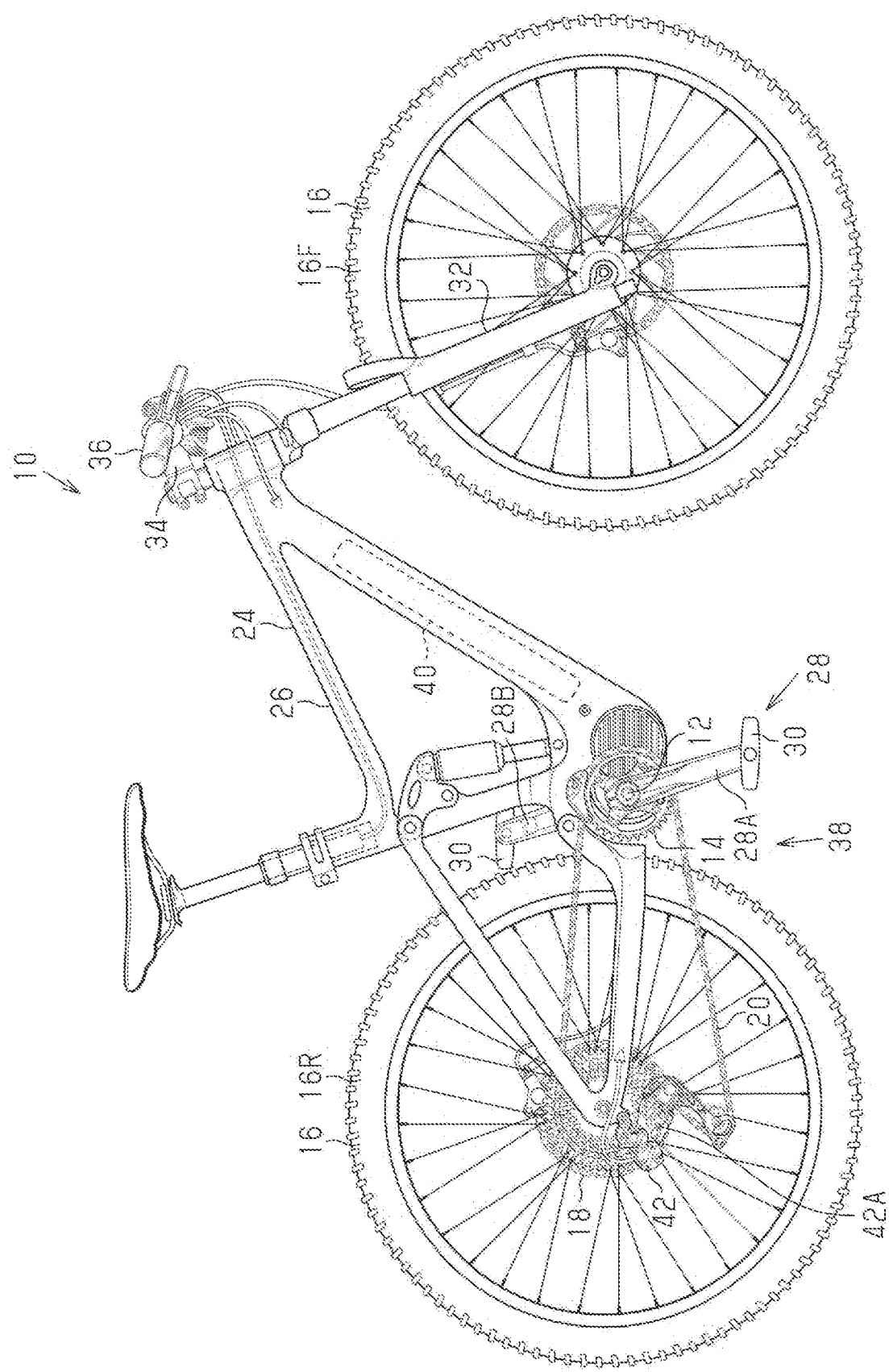
FIG. 1 is a side elevational view of a human-powered vehicle including a human-powered vehicle control device for a human-powered vehicle in accordance with an embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

A human-powered vehicle control device 60 (hereinafter referred to simply as the control device 60) for a human-powered vehicle will now be described with reference to FIGS. 1 to 4. The human-powered vehicle is a vehicle including at least one wheel and driven by at least a human driving force. The human-powered vehicle includes, for example, various types of bicycles such as a mountain bike, a road bike, a city bike, a cargo bike, a hand bike, and a recumbent bike. The number of wheels on the human-powered vehicle is not limited. The human-powered vehicle includes, for example, a unicycle and a vehicle including three or more wheels. The human-powered vehicle is not limited to a vehicle configured to be driven only by a human driving force. The human-powered vehicle includes an E-bike that uses a driving force of an electric motor in addition to the human driving force for propulsion. The E-bike includes an electric assist bicycle that assists in propulsion with an electric motor. In each embodiment described below, the human-powered vehicle refers to a bicycle.

The human-powered vehicle 10 includes a crank axle 12, a first rotational body 14, a wheel 16, a second rotational body 18, and a transmission body 20. The crank axle 12 is configured to receive a human driving force. The first rotational body 14 is connected to the crank axle 12. The second rotational body 18 is connected to the wheel 16. The transmission body 20 is engaged with the first rotational body 14 and the second rotational body 18 and is configured to transmit a driving force between the first rotational body 14 and the second rotational body 18.

In an example, the human-powered vehicle 10 further includes a vehicle body 24. In an example, the vehicle body 24 includes a frame 26. In an example, the wheel 16 includes a front wheel 16F and a rear wheel 16R. In an example, the crank axle 12 is rotatable relative to the frame 26. In an example, the human-powered vehicle 10 includes a crank 28. The crank 28 includes the crank axle 12 and two crank arms 28A and 28B. In an example, the crank arm 28A is provided on a first axial end of the crank axle 12, and the crank arm 28B is provided on a second axial end of the crank axle 12. In an example, the human-powered vehicle 10 includes two pedals 30. In an example, one of the two pedals 30 is coupled to the crank arm 28A. The other of the two pedals 30 is coupled to the crank arm 28B. In an example, the rear wheel 16R is driven in accordance with rotation of the crank axle 12. In an example, the rear wheel 16R is supported by the frame 26.

The front wheel 16F is attached to the frame 26 by a front fork 32. A handlebar 36 is coupled to the front fork 32 by a stem 34.

In an example, the human-powered vehicle 10 further includes a drive mechanism 38. In an example, at least one of the front wheel 16F and the rear wheel 16R is coupled to the crank 28 by the drive mechanism 38. In the present embodiment, the rear wheel 16R and the crank 28 are coupled by the drive mechanism 38.

In an example, the drive mechanism 38 includes at least one first rotational body 14, at least one second rotational body 18, and a transmission body 20. The at least one first rotational body 14 is connected to the crank axle 12. The at least one second rotational body 18 is connected to the wheel 16. The transmission body 20 is engaged with at least one first rotational body 14 and at least one second rotational body 18 and is configured to transmit driving force between the at least one first rotational body 14 and the at least one second rotational body 18. In an example, the transmission body 20 transmits rotational force of the at least one first rotational body 14 to the at least one second rotational body 18.

In an example, the at least one first rotational body 14 and the crank axle 12 are coaxially disposed. However, the at least one first rotational body 14 and the crank axle 12 do not have to be coaxially disposed. In an example, in a case where the at least one first rotational body 14 and the crank axle 12 are not coaxially disposed, the at least one first rotational body 14 and the crank axle 12 are connected by a first transmission mechanism. The first transmission mechanism can include multiple gears, a sprocket and a chain, pullies and a belt, or a shaft and a bevel gear. In an example, the at least one first rotational body 14 includes at least one driving sprocket.

In an example, the at least one second rotational body 18 and the rear wheel 16R are coaxially disposed. However, the at least one second rotational body 18 and the rear wheel 16R do not have to be coaxially disposed. In an example, in a case where the at least one second rotational body 18 and the rear wheel 16R are not coaxially disposed, the at least one second rotational body 18 and the rear wheel 16R are connected by a second transmission mechanism. The second transmission mechanism can include multiple gears, a sprocket and a chain, pullies and a belt, or a shaft and a bevel gear. In an example, the at least one second rotational body 18 includes at least one driven sprocket.

The at least one second rotational body 18 and the rear wheel 16R are connected by a third one-way clutch. In an example, the third one-way clutch includes at least one of a roller clutch, a sprag clutch, and a ratchet clutch. The third one-way clutch is configured to transmit driving force from the second rotational body 18 to the rear wheel 16R in a case where the second rotational body 18 rotates with forward rotation of the first rotational body 14. The third one-way clutch is configured to allow the rear wheel 16R to rotate relative to the second rotational body 18 in a case where the rear wheel 16R rotates forward at a higher speed than the second rotational body 18 rotates forward.

In an example, the human-powered vehicle 10 further includes a battery 40. The battery 40 includes one or more battery elements. The battery element includes a rechargeable battery. In an example, the battery 40 is configured to supply electric power to the control device 60 and a transmission device 42. In an example, the battery 40 is connected to the control device 60 so as to perform wired or wireless communication with the control device 60. In an example, the battery 40 is configured to communicate with the control device 60 through, power line communication (PLC), controller area network (CAN), or universal asynchronous receiver/transmitter (UART).

The human-powered vehicle 10 includes, for example, the transmission device 42. The transmission device 42 shifts a ratio R of a rotational speed of the wheel 16 to a rotational speed of the crank axle 12 of the human-powered vehicle 10 in stages. The transmission device 42 is provided, for example, in a transmission path of the human driving force in the human-powered vehicle 10 and is configured to shift the ratio R. The ratio R is, for example, a ratio R of the rotational speed of the wheel 16 to the rotational speed of the crank 28. The rotational speed of the wheel 16 includes, for example, the rotational speed of a driving wheel.

The transmission device 42 includes at least one of an external shifting device 42A and an internal shifting device. In the present embodiment, the transmission device 42 includes an external shifting device 42A that moves a chain of the human-powered vehicle 10 from one of a plurality of sprockets to another one of the sprockets. The transmission device 42 of the present embodiment includes the external shifting device 42A. The external shifting device 42A is configured to operate the transmission body 20 in order to shift the ratio R of a rotational speed of the wheel 16 to a rotational speed of the crank axle 12. The external shifting device 42A includes, for example, at least one of a front derailleur and a rear derailleur. In a case where the external shifting device 42A includes at least one of a front derailleur and a rear derailleur, the transmission body 20 includes a chain.

For example, the external shifting device 42A moves the transmission body 20 engaged with one of the plurality of sprockets to another one of the sprockets. In a case where the transmission device 42 includes an internal shifting device, the internal shifting device is provided, for example, on a hub of the rear wheel 16R. The internal shifting device can include a continuously variable transmission (CVT). The transmission device 42 includes, for example, an electric actuator 42B. The electric actuator 42B is configured to actuate, for example, the transmission device 42. The electric actuator 42B is configured to actuate, for example, the external shifting device 42A.

The external shifting device 42A is configured to operate the transmission body 20 in order to shift the ratio R of the rotational speed of the wheel 16 to the rotational speed of the crank axle 12. In an example, the external shifting device 42A is provided in the transmission path of the human driving force in the human-powered vehicle 10 and is configured to shift the ratio R. In an example, the external shifting device 42A operates the transmission body 20 to shift the ratio R by changing the engagement state of at least one of the at least one first rotational body 14 and the at least one second rotational body 18 with the transmission body 20. The relationship between the ratio R, the rotational speed of the wheel 16, and the rotational speed of the crank axle 12 is expressed by Equation 1. In Equation 1, the term "R" represents the ratio R. In Equation 1, the term "W" represents the rotational speed of the wheel 16. In Equation 1, the term "C" represents the rotational speed of the crank axle 12.

$$R = W(rpm)/C(rpm) \qquad \text{Equation 1:}$$

In an example, the external shifting device 42A can shift the ratio R at each of at least one shift stage. In an example, the external shifting device 42A is configured to operate the transmission body 20 to change at least one shift stage. In an example, the at least one shift stage is set in accordance with at least one of the at least one first rotational body 14 and the at least one second rotational body 18. In an example, in a case where the at least one shift stage includes a plurality of shift stages, each of the shift stages is set to a different ratio R. In an example, the ratio R increases as the shift stage increases.

In an example, in a case where the at least one first rotational body 14 includes a plurality of first rotational bodies 14 and the at least one second rotational body 18 includes a plurality of second rotational bodies 18, the shift stage is set in accordance with a combination of one of the first rotational bodies 14 and one of the second rotational bodies 18. In an example, in a case where the at least one first rotational body 14 includes one first rotational body 14 and the at least one second rotational body 18 includes a plurality of second rotational bodies 18, the shift stage is set in accordance with the number of the second rotational bodies 18. In an example, in a case where the at least one first rotational body 14 includes a plurality of first rotational bodies 14 and the at least one second rotational body 18 includes one second rotational body 18, the shift stage is set in accordance with the number of the first rotational bodies 14.

In an example, the external shifting device 42A moves a chain that engages with one of a plurality of sprockets to another one of the sprockets. In an example, the combination of a sprocket having the smallest number of teeth among the plurality of driving sprockets and a sprocket having the largest number of teeth among the plurality of driven sprockets corresponds to the minimum shift stage that can be achieved by the external shifting device 42A. In an example, the combination of a sprocket having the largest number of teeth among the plurality of driving sprockets and a sprocket having the smallest number of teeth among the plurality of driven sprockets corresponds to the maximum shift stage that can be achieved by the external shifting device 42A.

In a case where the external shifting device 42A includes a front derailleur, for example, the plurality of first rotational bodies 14 includes two or three sprockets. For example, the plurality of first rotational bodies 14 includes two sprockets.

In a case where the external shifting device 42A includes a front derailleur, for example, the external shifting device 42A is configured to perform a shifting action that moves the transmission body 20 from one of the plurality of first rotational bodies 14 to another one of the first rotational bodies 14. The front derailleur operates the transmission body 20 to shift the ratio R by changing the engagement state of the at least one first rotational body 14 with the transmission body 20. In an example, the plurality of first rotational bodies 14 includes a plurality of sprockets.

In an example, in a case where the external shifting device 42A includes a rear derailleur, the at least one second rotational body 18 includes two to twenty sprockets. In an example, the plurality of second rotational bodies 18 includes twelve sprockets.

In a case where the external shifting device 42A includes a rear derailleur, for example, at least one of the plurality of second rotational bodies 18 includes at least two shifting facilitation regions 22 in a circumferential direction. The at least two shifting facilitation regions 22 are, for example, individually set for at least one of the plurality of second rotational bodies 18. The at least two shifting facilitation regions 22 are regions that facilitate movement of the transmission body 20 from one of the plurality of second rotational bodies 18 to an adjacent one of the second rotational bodies 18 performed by the rear derailleur.

In a case where at least two shifting facilitation regions 22 are individually set for each of the second rotational bodies 18, for example, the at least two shifting facilitation regions 22 can differ among all of the second rotational bodies 18 or can be the same in at least two of the second rotational bodies 18. The at least two shifting facilitation regions 22 can be omitted from at least one of the plurality of second rotational bodies 18. In an example, among the plurality of driven sprockets, the smallest driven sprocket does not include at least two shifting facilitation regions 22, whereas the remaining driven sprockets include at least two shifting facilitation regions 22.

In a case where the at least two shifting facilitation regions 22 are individually set for each of the second rotational bodies 18, for example, the at least two shifting facilitation regions 22 include a first shifting facilitation region 22A and a second shifting facilitation region 22B. In an example, the first shifting facilitation region 22A facilitates movement of the chain from one of the driven sprockets to another one of the driven sprockets. At least one first shifting facilitation region 22A is configured to facilitate a shifting action when the ratio is increased. In an example, the first shifting facilitation region 22A facilitates movement of the chain from a driven sprocket having a larger number of teeth to a sprocket having a smaller number of teeth among the plurality of sprockets. The first shifting facilitation region 22A includes, for example, a sprocket tooth having a structure that facilitates disengagement of the chain from the sprocket tooth.

In an example, the second shifting facilitation region 22B facilitates movement of the chain from the other one of the sprockets to the one of the sprockets. The at least one second shifting facilitation region 22B is configured to facilitate a shifting action when the ratio is decreased. For example, the second shifting facilitation region 22B facilitates movement of the chain from a sprocket having a smaller number of teeth to a sprocket having a larger number of teeth among the plurality of sprockets. The second shifting facilitation region 22B includes, for example, a sprocket tooth having a structure that facilitates engagement of the chain with the sprocket tooth.

Figure 2:
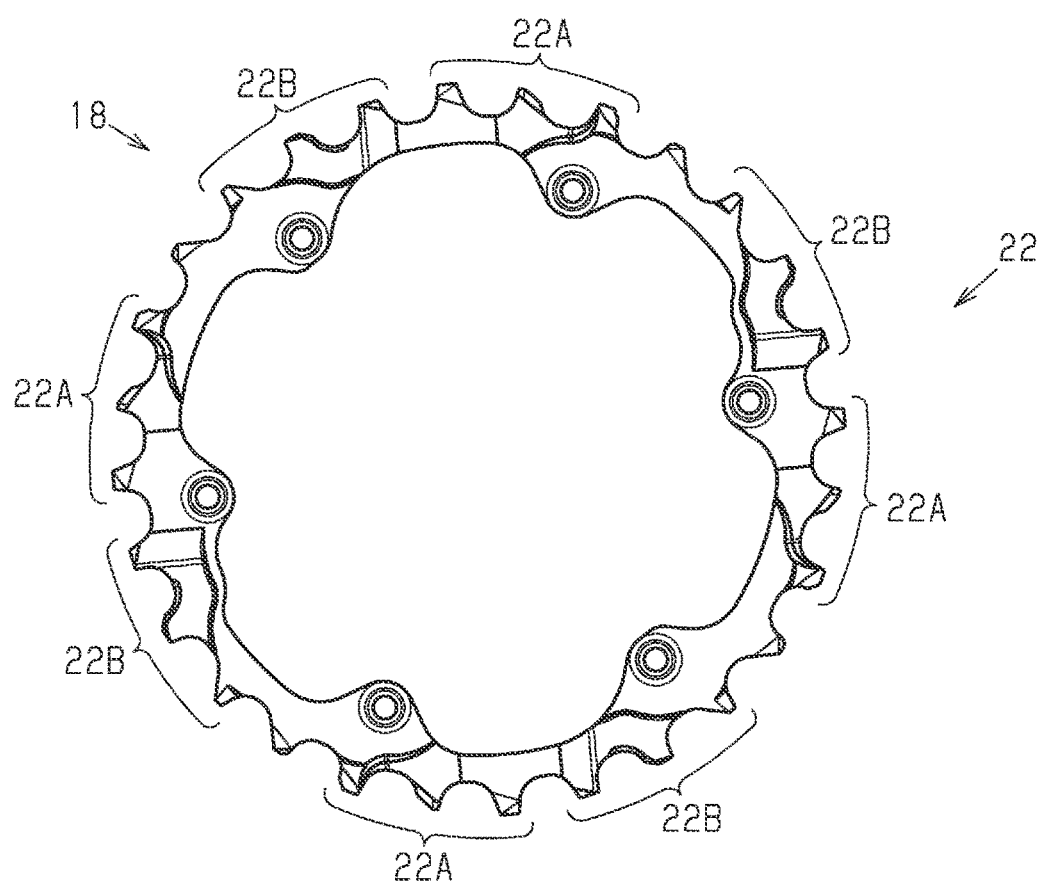
FIG. 2 is a side elevational view of a second rotational body shown in FIG. 1.

FIG. 2 shows one of the second rotational bodies 18. The one of the second rotational bodies 18 shown in FIG. 2 includes, for example, four first shifting facilitation regions 22A and four second shifting facilitation regions 22B. For example, the four first shifting facilitation regions 22A and the four second shifting facilitation regions 22B are alternately provided in the circumferential direction of the one of the second rotational bodies 18.

In a case where the external shifting device 42A includes a front derailleur, for example, at least one of the plurality of first rotational bodies 14 can include a shifting facilitation region 22 in the same manner as at least one of the second rotational bodies 18.

In an example, the human-powered vehicle 10 further includes a shift operating device 44. The shift operating device 44 is, for example, provided on the handlebar 36. The shift operating device 44 includes, for example, a first operating portion for increasing the ratio R and a second operating portion for decreasing the ratio R.

Figure 3:
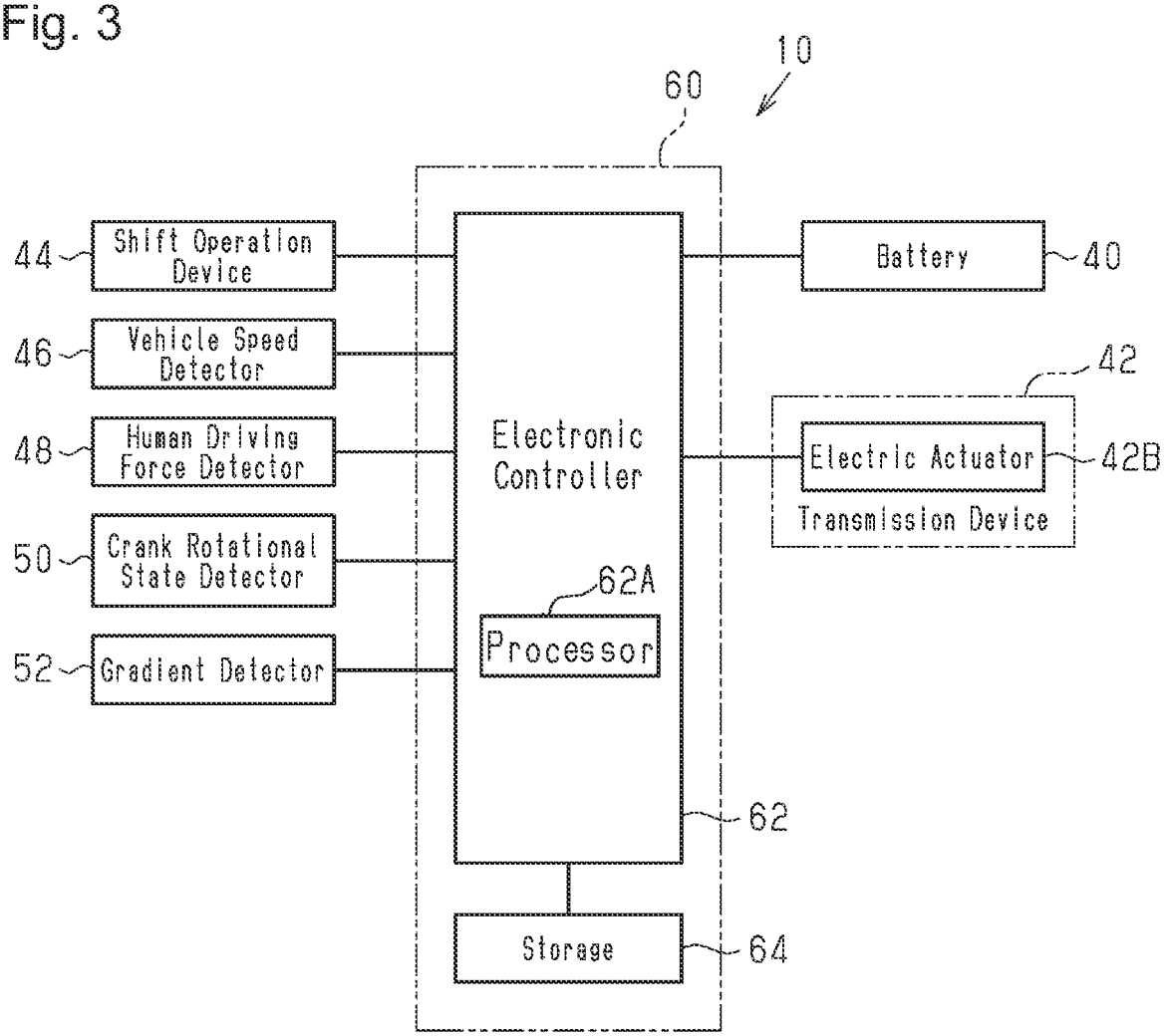
FIG. 3 is a block diagram showing the electrical configuration of the human-powered vehicle shown in FIG. 1.

As seen in FIG. 3, the human-powered vehicle 10 further includes one or more detectors for detecting one or more operating conditions of the human-powered vehicle 10. The term "detector" as used herein refers to a hardware device or instrument designed to detect the presence or absence of a particular event, object, substance, or a change in its environment, and to emit a signal in response. The term "detector" as used herein do not include a human being.

Also, as seen in FIG. 3, the human-powered vehicle 10 further includes an electronic controller 62. In particular, the control device 60 of the human-powered vehicle 10 includes the electronic controller 62. The electronic controller 72 is configured to receive input signals from various detectors as explained below.

For example, the human-powered vehicle 10 further includes a vehicle speed detector 46. For example, the vehicle speed detector 46 is connected to the electronic controller 62 so as to perform wired or wireless communication with the electronic controller 62. In an example, the vehicle speed detector 46 is configured to detect information related to vehicle speed of the human-powered vehicle 10. In an example, the vehicle speed detector 46 is configured to detect information related to rotational speed of the wheel 16. In an example, the vehicle speed detector 46 is configured to detect a magnet provided on at least one of the front wheel 16F and the rear wheel 16R.

In an example, the vehicle speed detector 46 is configured to output a detection signal a predetermined number of times in a single rotation of the wheel 16. In an example, the predetermined number of times is one. In an example, the vehicle speed detector 46 outputs a signal corresponding to rotational speed of the wheel 16. The electronic controller 62 calculates the vehicle speed of the human-powered vehicle 10 based on a signal corresponding to the rotational speed of the wheel 16 and information related to the circumferential length of the wheel 16. In an example, the information related to the circumferential length of the wheel 16 is stored in storage 64.

In an example, the human-powered vehicle 10 further includes a human driving force detector 48. The human driving force detector 48 is connected to the electronic controller 62 so as to perform wired or wireless communication with the electronic controller 62. The human driving force detector 48 is configured to output a signal corresponding to torque that is applied to the crank axle 12 by a human driving force. The signal corresponding to torque applied to the crank axle 12 by the human driving force includes information related to the human driving force that is input to the human-powered vehicle 10.

In an example, the human driving force detector 48 is provided on a member included in the transmission path of the human driving force or a member provided near the member included in the transmission path. In an example, the member included in the transmission path of the human driving force includes the crank axle 12 and a member that transmits the human driving force between the crank axle 12 and at least one first rotational body 14. In an example, the driving force transmission member is provided on the outer circumference of the crank axle 12.

The human driving force detector 48 includes a strain sensor, a magnetostrictive sensor, a pressure sensor, and the like. The strain sensor includes a strain gauge. The human driving force detector 48 can have any configuration that obtains information related to the human driving force.

In an example, the human driving force detector 48 can be provided on at least one of the crank arms 28A and 28B and the two pedals 30. In an example, in a case where the human driving force detector 48 is provided on at least one of the two pedals 30, the human driving force detector 48 can include a sensor that detects pressure applied to the at least one of the two pedals 30. For example, the human driving force detector 48 can be provided on a chain included in the transmission body 20. In an example, in a case where the human driving force detector 48 is provided on a chain, the human driving force detector 48 can include a sensor that detects tension of the chain.

In an example, the human-powered vehicle 10 further includes a crank rotation state detector 50. In an example, the crank rotation state detector 50 is connected to the electronic controller 62 so as to perform wired or wireless communication with the electronic controller 62. The crank rotation state detector 50 detects a rotational amount of at least one of the crank axle 12 and the at least one first rotational body 14. In an example, the crank rotation state detector 50 is configured to detect information corresponding to the rotational speed of the crank axle 12. In an example, the crank rotation state detector 50 is configured to detect information corresponding to a rotational speed of the at least one first rotational body 14. The information corresponding to the rotational speed of the crank axle 12 includes an angular acceleration of the crank axle 12. The information according to rotational speed of the at least one first rotational body 14 includes angular acceleration of the at least one first rotational body 14.

In an example, the crank rotation state detector 50 includes a magnetic sensor that outputs a signal corresponding to the strength of a magnetic field. The crank rotation state detector 50 includes an annular magnet having a plurality of magnetic poles arranged in the circumferential direction. The annular magnet is provided on the crank axle 12, on the at least one first rotational body 14, or in a power transmission path between the crank axle 12 and the at least one first rotational body 14. In an example, the annular magnet includes one S-pole and one N-pole. The S-pole and the N-pole each continuously extend 180° about the axis of the crank axle 12.

In an example, the crank rotation state detector 50 outputs a signal corresponding to at least one of the rotational speed of the crank axle 12 and the rotational speed of the at least one first rotational body 14. In an example, the crank rotation state detector 50 is configured to output a detection signal corresponding to a rotational angle of the crank axle 12 in a single rotation of at least one of the crank axle 12 and the at least one first rotational body 14. The crank rotation state detector 50 can include, for example, an optical sensor, an acceleration sensor, a gyro sensor, or a torque sensor instead of the magnetic sensor.

In an example, the crank rotation state detector 50 is provided on the frame 26 of the human-powered vehicle 10. In an example, in a case where the crank rotation state detector 50 is provided on the frame 26, the crank rotation state detector 50 can be configured to include a vehicle speed sensor. In a case where the crank rotation state detector 50 includes a vehicle speed sensor, the electronic controller 62 can be configured to calculate the rotational speed of the crank axle 12 in accordance with the vehicle speed detected by the vehicle speed sensor and the ratio R.

The crank rotation state detector 50 can be configured to detect a rotational amount of the at least one second rotational body 18. The crank rotation state detector 50 can be configured to detect information corresponding to a rotational speed of the at least one second rotational body 18. In an example, the information corresponding to rotational speed of the at least one second rotational body 18 includes an angular acceleration of the at least one second rotational body 18. In an example, the crank rotation state detector 50 can output a signal corresponding to rotational speed of the at least one second rotational body 18.

In an example, the human-powered vehicle 10 further includes a gradient detector 52. The gradient detector 52 includes, for example, at least one of an inclination sensor and a global positioning system (GPS) receiver. The inclination sensor includes, for example, at least one of a gyro sensor and an acceleration sensor. In a case where the gradient detector 52 includes a GPS receiver, the storage 64 stores, in advance, map information including information related to gradients of roads traveled. The electronic controller 62 obtains the gradient of the road on which the human-powered vehicle 10 is currently traveling.

As mentioned above, the human-powered vehicle control device 60 includes the electronic controller 62. The electronic controller 62 is formed of one or more semiconductor chips that are mounted on a circuit board. Thus, the terms "electronic controller" and "controller" as used herein refers to hardware that executes a software program, and does not include a human being. In an example, the electronic controller 62 includes one or more processors 62A that execute predetermined control programs. In an example, each of the processors 62A of the electronic controller 62 includes, for example, a central processing unit (CPU) or a micro processing unit (MPU).

In an example, the processors 62A of the electronic controller 62 can be located at separate locations. In an example, some parts of the processor 62A can be provided on the human-powered vehicle 10, while other ones of the processors 62A can be provided on a server connected to the Internet. In a case where the processor includes parts arranged at separate locations, the parts of the processor are connected so as to communicate with each other via a wireless communication device. The electronic controller 62 can include one or more microcomputers.

In an example, the control device 60 further includes the storage 64. The storage 64 is any computer storage device or any non-transitory computer-readable medium with the sole exception of a transitory, propagating signal. In an example, the storage 64 is connected to the electronic controller 62 to perform wired or wireless communication with the electronic controller 62. In an example, the storage 64 stores control programs and information used for control processing. In an example, the storage 64 includes a non-volatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

The electronic controller 62 controls the transmission device 42. The electronic controller 62 is configured to control the transmission device 42 so that the transmission device 42 performs a first shifting action that shifts the ratio R by only one stage in a case where a shifting condition is satisfied. The transmission device 42 is configured to be controllable by the electronic controller 62 so that the transmission device 42 performs a second shifting action that shifts the ratio R by two or more stages in a case where the shifting condition is satisfied and a vehicle state of the human-powered vehicle is a predetermined state. The predetermined state includes a state in which a change amount of a parameter related to the vehicle state of the human-powered vehicle 10 is a predetermined amount or greater.

In an example, the first shifting action includes a shifting action that moves the chain of the human-powered vehicle 10 from a first one of the sprockets onto a second one of the sprockets that is adjacent to the first sprocket. In the first shifting action, the electronic controller 62, for example, moves the external shifting device 42A from a position corresponding to the first sprocket that is engaged with the chain to a position corresponding to the second sprocket that is adjacent to the sprocket engaged with the chain so that the ratio R is shifted by only one stage. In a case where the transmission device 42 performs the first shifting action and shifts the ratio R by two or more stages, the electronic controller 62 repeats initiation and completion of the first shifting action so that the ratio R is shifted by two or more stages.

In an example, the second shifting action includes a shifting action that moves the chain of the human-powered vehicle 10 from a third one of the sprockets onto a fourth one of the sprockets that sandwiches another sprocket with the third sprocket. In the second shifting action, the electronic controller 62, for example, moves the external shifting device 42A from a position corresponding to the third sprocket that is engaged with the chain to a position corresponding to the fourth sprocket that is not adjacent to the third sprocket, engaged with the chain, so that the ratio R is shifted by two or more stages. In an example, the second shifting action includes a shifting action that controls the transmission device 42 so that an estimated rotational speed of the crank axle 12 calculated from vehicle speed and the ratio is within a predetermined range. For example, in the second shifting action, the electronic controller 62 is configured to calculate a shift stage at which the estimated rotational speed of the crank axle 12 calculated from the vehicle speed and the ratio R is within the predetermined range, and then control the external shifting device 42A so that the chain engages with the fourth sprocket that corresponds to the calculated shift stage. For example, in a case where it is estimated that the estimated rotational speed of the crank axle 12 will be within the predetermined range by changing the ratio R by only one stage, the electronic controller 62 can be configured to control the transmission device 42 to shift the ratio R by only one stage in the first shifting action regardless of the change amount of the parameter related to the vehicle state of the human-powered vehicle 10 being the predetermined amount or greater.

In the first shifting action, for example, the electronic controller 62 shifts the ratio R by only one stage so that the shifting action is performed based on the shifting facilitation region 22. In the first shifting action, for example, in an upshift operation, the electronic controller 62 is configured to move the chain through a position corresponding to the first shifting facilitation region 22A of the first sprocket in a state in which the external shifting device 42A is moved from a position corresponding to the first sprocket to a position corresponding to the second sprocket. In the first shifting action, for example, in a downshift operation, the electronic controller 62 is configured to move the chain through a position corresponding to the second shifting facilitation region 22B of the second sprocket in a state in which the external shifting device 42A is moved from a position corresponding to the first sprocket to a position corresponding to the second sprocket. A case where the chain is located at the position corresponding to the second shifting facilitation region 22B of the second sprocket is a case where the chain moved by the external shifting device 42A is located at a position where the chain is contactable with a sprocket tooth of the second sprocket in the second shifting facilitation region 22B.

In the second shifting action, for example, the electronic controller 62 shifts the ratio R by two or more stages so that the shifting action is partially performed irrespective of the shifting facilitation region 22. In the second shifting action, for example, in an upshift operation, the electronic controller 62 is configured to move the external shifting device 42A from a position corresponding to the third sprocket to a position corresponding to the fourth sprocket without determining that the chain moves through a position corresponding to the first shifting facilitation region 22A of the third sprocket. In the second shifting action, for example, in a downshift operation, the electronic controller 62 is configured to move the external shifting device 42A from a position corresponding to the third sprocket to a position corresponding to the fourth sprocket without determining that the chain moves through a position corresponding to the second shifting facilitation region 22B of a sprocket disposed between the third sprocket and the fourth sprocket. A case where the chain is located at a position corresponding to the second shifting facilitation region 22B of the fourth sprocket is a case where the chain moved by the external shifting device 42A is located at a position where the chain is contactable with a sprocket tooth of the fourth sprocket in the second shifting facilitation region 22B.

In the first shifting action, the electronic controller 62 can initiate the shifting action based on the shifting facilitation region 22. In the first shifting action, for example, in an upshift operation, the electronic controller 62 can control the external shifting device 42A so that the external shifting device 42A is actuated in a case where the chain is located at a position corresponding to the first shifting facilitation region 22A of the first sprocket. In the first shifting action, for example, in a downshift operation, the electronic controller 62 can control the external shifting device 42A so that the external shifting device 42A is actuated in a case where the chain is located at a position corresponding to the second shifting facilitation region 22B of the second sprocket.

The shifting condition relates to, for example, at least one of a traveling state and a traveling environment of the human-powered vehicle 10. The traveling state includes, for example, at least one of a rotational speed of the crank axle 12, the human driving force, and the vehicle speed. The traveling environment includes, for example, the gradient of a road traveled. At least one of the traveling state and the traveling environment includes, for example, traveling resistance. The traveling resistance includes, for example, at least one of air resistance, rolling resistance, gradient resistance, and acceleration resistance.

The shifting condition includes, for example, at least one of a rotational speed of the crank axle 12, human driving force, and vehicle speed. In the present embodiment, the shifting condition includes rotational speed of the crank axle 12. In an example, in a case where the rotational speed of the crank axle 12 is greater than an upper limit threshold value, the electronic controller 62 controls the transmission device 42 so that the ratio R is increased. In a case where the rotational speed of the crank axle 12 is less than a lower limit threshold value, the electronic controller 62 controls the transmission device 42 so that the ratio R is decreased.

In a case where the shifting condition includes human driving force, the shifting condition is satisfied, for example, in a case where human driving force is outside a first range. In a case where the shifting condition includes vehicle speed, the shifting condition is satisfied, for example, in a case where the vehicle speed is outside a second range.

The shifting condition includes, for example, at least one of gradient of a road traveled and traveling resistance. In a case where the shifting condition includes the gradient of a road traveled, for example, the shifting condition is satisfied in a case where the gradient of the road traveled is outside a third range. In a case where the shifting condition includes traveling resistance, for example, the shifting condition is satisfied in a case where the travel resistance is outside a fourth range.

In an example, the parameter includes an estimated rotational speed of the crank axle 12 calculated from vehicle speed and the ratio R. For example, the electronic controller 62 calculates the estimated rotational speed of the crank axle 12 by dividing the vehicle speed by the ratio R and the tire diameter stored in advance in the storage 64. In a case where the parameter includes the estimated rotational speed of the crank axle 12, the predetermined amount is, for example, greater than or equal to 10 rpm and less than or equal to 30 rpm. In a case where the parameter includes the estimated rotational speed of the crank axle 12, the predetermined amount is, for example, 20 rpm.

The parameter includes, for example, rotational speed of the crank axle 12. In a case where the parameter includes the rotational speed of the crank axle 12, the predetermined amount is, for example, greater than or equal to 10 rpm and less than or equal to 30 rpm. In a case where the parameter includes the rotational speed of the crank axle 12, the change amount of the parameter is expressed, for example, as a change amount in a case where a motion state of the vehicle changes from a first state to a second state. The motion state of the vehicle greatly differs between the first state and the second state. In an example, in a case where the human-powered vehicle 10 accelerates and then quickly decelerates, the electronic controller 62 determines that the motion state has changed from the first state to the second state. The case where the human-powered vehicle 10 accelerates and then suddenly decelerates includes, for example, a case where the road on which the human-powered vehicle 10 is traveling suddenly changes from a downhill to an uphill. In a case where the parameter includes the rotational speed of the crank axle 12, the predetermined amount is, for example, 20 rpm.

The parameter includes, for example, the vehicle speed. In a case where the parameter includes the vehicle speed, the predetermined amount is, for example, greater than or equal to 1 km/h and less than or equal to 10 km/h. In a case where the parameter includes the vehicle speed, the change amount of the parameter is expressed, for example, as a change amount per detection cycle of the vehicle speed detector 46. In a case where the parameter includes the vehicle speed, the predetermined amount is, for example, 5 km/h.

The parameter includes, for example, the gradient of the road traveled by the human-powered vehicle 10. The gradient of the road traveled is expressed by, for example, an angle. In a case where the parameter includes the gradient of the road traveled, the change amount of the parameter is expressed as, for example, an amount of change per second. In a case where the parameter includes the gradient of the road traveled, the predetermined amount is, for example, greater than or equal to 5 degrees and less than or equal to 15 degrees. In a case where the parameter includes the gradient of the road traveled, the predetermined amount is, for example, 10 degrees.

In an example, the predetermined state includes a state in which human driving force input to the human-powered vehicle 10 is within a predetermined range. In an example, the predetermined state includes a state in which the human driving force is less than or equal to a first driving force and the shifting condition for increasing the ratio R is satisfied. In an example, the predetermined state includes a case where the human driving force is less than or equal to the first driving force, the acceleration of the human-powered vehicle 10 is greater than or equal to a first acceleration, and the shifting condition for increasing the ratio R is satisfied. The first driving force is, for example, greater than or equal to 1 Nm and less than or equal to 20 Nm. The first driving force is, for example, 10 Nm. The first acceleration is, for example, greater than or equal to 0 km/h/s. The first acceleration is 0 km/h/s. In an example, the predetermined state includes a case where the human driving force is greater than or equal to a second driving force and the shifting condition for decreasing the ratio R is satisfied. In an example, the predetermined state includes a case where the human driving force is greater than or equal to the second driving force, the acceleration of the human-powered vehicle 10 is less than or equal to a second acceleration, and the shifting condition for decreasing the ratio R is satisfied. The second driving force is, for example, greater than the first driving force. The second driving force is, for example, greater than or equal to 60 Nm and less than or equal to 80 Nm. The second driving force is, for example, 70 Nm. The second acceleration is, for example, less than or equal to 0 km/h/s. The second acceleration is, for example, 0 km/h/s.

In an example, the predetermined state includes a state in which a difference of a detected rotational speed obtained from an output of a detector that detects the rotational speed of the crank axle 12 and an estimated rotational speed of the crank axle 12 calculated from vehicle speed and the ratio R is greater than or equal to a predetermined difference. The rotation speed of the crank axle 12 is detected by the crank rotation state detector 50. The predetermined difference is, for example, a 10 rpm.

In an example, the predetermined state includes a state in which a rotated amount of the crank axle 12 is less than or equal to a predetermined rotated amount. The rotated amount of the crank axle 12 can be expressed by a stroke amount of the pedals 30. The predetermined rotated amount is, for example, greater than or equal to 270 degrees and less than or equal to 450 degrees. The predetermined rotated amount is, for example, 360 degrees.

Figure 4:
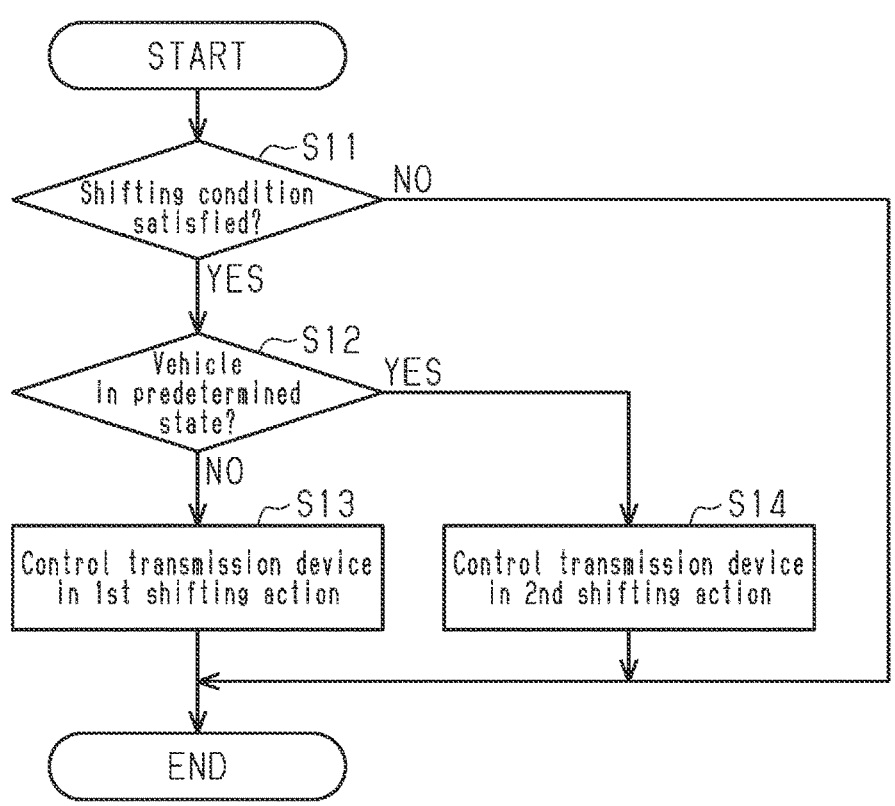
FIG. 4 is a flowchart of a control process for controlling a transmission device executed by an electronic controller shown in FIG. 2.

A control process executed by the electronic controller 62 for controlling the transmission device 42 will be described with reference to FIG. 4. For example, in a case where electric power is supplied to the electronic controller 62, the electronic controller 62 starts the process and proceeds to step S11 of the flowchart shown in FIG. 4. In a case where the flowchart shown in FIG. 4 ends, the electronic controller 62 repeats the process from step S11 after a predetermined interval, for example, until the supply of electric power stops.

In step S11, the electronic controller 62 determines whether the shifting condition is satisfied. In step S11, in a case where the shifting condition is not satisfied, the electronic controller 62 ends the process. In a case where the shifting condition is satisfied, the electronic controller 62 proceeds to step S12.

In step S12, the electronic controller 62 determines whether the vehicle is in a predetermined state. In a case where the vehicle is in the predetermined state, the electronic controller 62 proceeds to step S13. In step S13, the electronic controller 62 controls the transmission device 42 in the first shifting action and then ends the process.

In step S12, in a case where the vehicle is not in the predetermined state, the electronic controller 62 proceeds to step S14. In step S14, the electronic controller 62 controls the transmission device 42 in the second shifting action and then ends the process.

Modifications

The descriptions related to the above embodiment exemplifies, without any intention to limit, applicable forms of a human-powered vehicle control device according to the present disclosure. The human-powered vehicle control device according to the present disclosure can be applied to, for example, modifications of the embodiment that are described below and combinations of at least two of the modifications that do not contradict each other. In the following modifications, same reference characters are given to those elements that are the same as the corresponding elements of the above embodiment. Such elements will not be described in detail.

The transmission device 42 can be configured to be controllable by the electronic controller 62 so that the transmission device 42 performs a first shifting action that shifts the ratio R in a case where the shifting condition is satisfied and a predetermined condition is unsatisfied, and so that the transmission device 42 performs a second shifting action that shifts the ratio R in a case where the shifting condition is satisfied and the predetermined condition is satisfied. The first shifting action includes a shifting action that moves the chain of the human-powered vehicle 10 from a first one of the sprockets onto a second one of the sprockets that is adjacent to the first sprocket. The second shifting action includes a shifting action that moves the chain of the human-powered vehicle 10 from a third one of the sprockets onto a fourth one of the sprockets that sandwiches another sprocket with the third sprocket. In an example, the predetermined condition includes a case where a vehicle state of the human-powered vehicle 10 satisfies a predetermined state. In an example, the predetermined state includes a state in which a change amount of a parameter related to the vehicle state of the human-powered vehicle 10 is a predetermined amount or greater. The predetermined condition can be satisfied in a case where, for example, a parameter related to the vehicle state of the human-powered vehicle 10 is outside a predetermined range instead of the change amount of the parameter.

Figure 5:
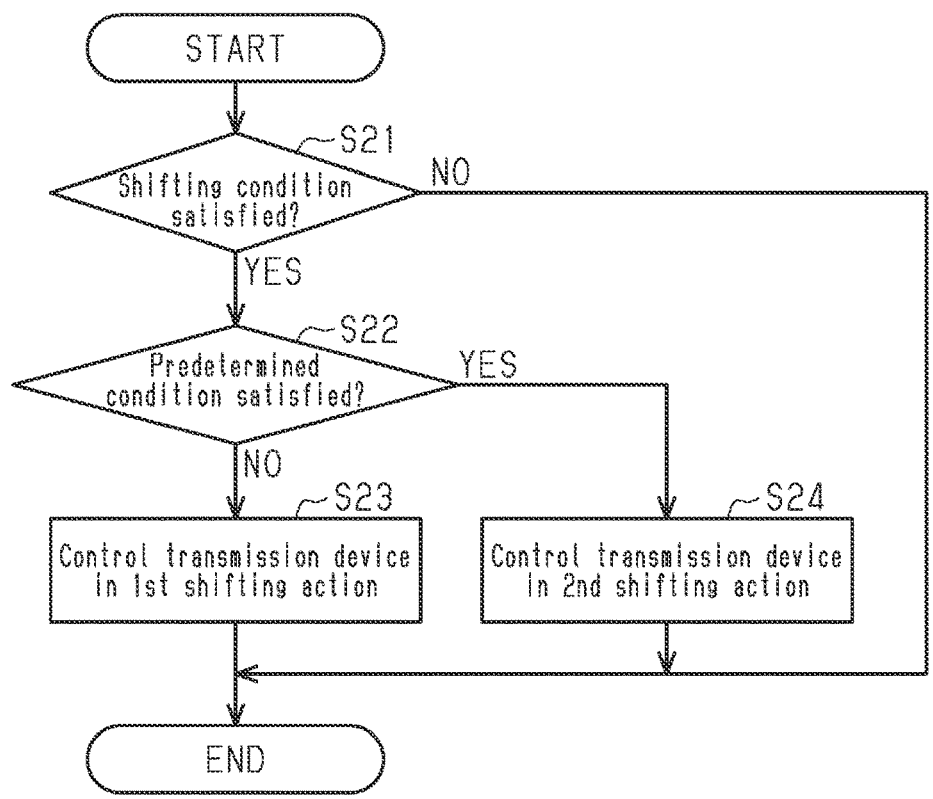
FIG. 5 is a flowchart of a control process for controlling a transmission device executed by an electronic controller in accordance with one modification.

A process executed by the electronic controller 62 for controlling the transmission device 42 will be described with reference to FIG. 5. In a case where electric power is supplied to, for example, the electronic controller 62, the electronic controller 62 starts the process and proceeds to step S21 of the flowchart shown in FIG. 5. In a case where the flowchart shown in FIG. 5 ends, the electronic controller 62 repeats the process from step S21 after a predetermined interval, for example, until the supply of electric power stops.

In step S21, the electronic controller 62 determines whether the shifting condition is satisfied. In step S21, in a case where the shifting condition is not satisfied, the electronic controller 62 ends the process. In a case where the shifting condition is satisfied, the electronic controller 62 proceeds to step S22.

In step S22, the electronic controller 62 determines whether the predetermined condition is satisfied. In a case where the predetermined condition is satisfied, the electronic controller 62 proceeds to step S23. In step S23, the electronic controller 62 controls the transmission device 42 in the first shifting action and then ends the process.

In a case where it is determined in step S22 that the predetermined condition is unsatisfied, the electronic controller 62 proceeds to step S24. In step S24, the electronic controller 62 controls the transmission device 42 in the second shifting action and then ends the process.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A control device for a human-powered vehicle, the control device comprising:
   an electronic controller configured to control a transmission device that shifts a ratio of a rotational speed of a wheel of a human-powered vehicle to a rotational speed of a crank axle of the human-powered vehicle in stages, wherein:
   the electronic controller is configured to control the transmission device so that the transmission device performs a first shifting action that shifts the ratio by only one stage in a case where a shifting condition is satisfied;
   the transmission device is configured to be controllable by the electronic controller so that the transmission device performs a second shifting action that shifts the ratio by two or more stages in a case where the shifting condition is satisfied and a vehicle state of the human-powered vehicle is a predetermined state; and the predetermined state includes a state in which a change amount of a parameter related to the vehicle state of the human-powered vehicle is a predetermined amount or greater.

2. The control device according to claim 1, wherein:
the transmission device includes an external shifting device that moves a chain of the human-powered vehicle from one of a plurality of sprockets onto another one of the sprockets;
the first shifting action includes a shifting action that moves the chain of the human-powered vehicle from a first one of the sprockets onto a second one of the sprockets that is adjacent to the first sprocket; and
the second shifting action includes a shifting action that moves the chain of the human-powered vehicle from a third one of the sprockets onto a fourth one of the sprockets that sandwiches another sprocket with the third sprocket.

3. The control device according to claim 1, wherein
the parameter includes an estimated rotational speed of the crank axle calculated from a vehicle speed and the ratio.

4. The control device according to claim 1, wherein
the parameter includes the rotational speed of the crank axle.

5. The control device according to claim 1, wherein
the parameter includes a vehicle speed.

6. The control device according to claim 1, wherein
the predetermined state includes a state in which a human driving force input to the human-powered vehicle is within a predetermined range.

7. The control device according to claim 6, wherein
the predetermined state includes a state in which the human driving force is less than or equal to a first driving force and the shifting condition for increasing the ratio is satisfied.

8. The control device according to claim 7, wherein
the predetermined state includes a case where the human driving force is less than or equal to the first driving force, an acceleration of the human-powered vehicle is greater than or equal to a first acceleration, and the shifting condition for increasing the ratio is satisfied.

9. The control device according to claim 6, wherein
the predetermined state includes a case where the human driving force is greater than or equal to a second driving force and the shifting condition for decreasing the ratio is satisfied.

10. The control device according to claim 9, wherein
the predetermined state includes a case where the human driving force is greater than or equal to the second driving force, an acceleration of the human-powered vehicle is less than or equal to a second acceleration, and the shifting condition for decreasing the ratio is satisfied.

11. The control device according to claim 1, wherein
the predetermined state includes a state in which a difference of a detected rotational speed obtained from an output of a detector that detects the rotational speed of the crank axle and an estimated rotational speed of the crank axle calculated from vehicle speed and the ratio is greater than or equal to a predetermined difference.

12. The control device according to claim 1, wherein
the predetermined state includes a state in which a rotated amount of the crank axle is less than or equal to a predetermined rotated amount.

13. The control device according to claim 1, wherein
the shifting condition is related to at least one of a traveling state of the human-powered vehicle and a traveling environment of the human-powered vehicle.

14. The control device according to claim 1, wherein
the shifting condition includes at least one of the rotational speed of the crank axle, the human driving force input to the human-powered vehicle, and a vehicle speed.

15. The control device according to claim 1, wherein:
the shifting condition includes the rotational speed of the crank axle;
the electronic controller controls the transmission device to increase the ratio in a case where the rotational speed of the crank axle is greater than an upper limit threshold value; and
the electronic controller controls the transmission device to decrease the ratio in a case where the rotational speed of the crank axle is less than a lower limit threshold value.

16. The control device according to claim 2, wherein
the second shifting action includes a shifting action that controls the transmission device so that an estimated rotational speed of the crank axle calculated from a vehicle speed and the ratio is within a predetermined range.

17. A control device for a human-powered vehicle, the control device comprising:
an electronic controller configured to control a transmission device that shifts a ratio of a rotational speed of a wheel of a human-powered vehicle to a rotational speed of a crank axle of the human-powered vehicle in stages, wherein:
the transmission device includes an external shifting device that moves a chain of the human-powered vehicle from one of a plurality of sprockets onto another one of the sprockets;
the transmission device is configured to be controllable by the electronic controller so that the transmission device performs a first shifting action that shifts the ratio in a case where a shifting condition is satisfied and a predetermined condition is unsatisfied;
the transmission device is configured to be controllable by the electronic controller so that the transmission device performs a second shifting action that shifts the ratio in a case where the shifting condition is satisfied and the predetermined condition is satisfied;
the first shifting action includes a shifting action that moves the chain of the human-powered vehicle from a first one of the sprockets onto a second one of the sprockets that is adjacent to the first sprocket; and
the second shifting action includes a shifting action that moves the chain of the human-powered vehicle from a third one of the sprockets onto a fourth one of the sprockets that sandwiches another sprocket with the third sprocket.

18. The control device according to claim 17, wherein:
the predetermined condition includes a case where a vehicle state of the human-powered vehicle satisfies a predetermined state; and
the predetermined state includes a state in which a change amount of a parameter related to the vehicle state of the human-powered vehicle is a predetermined amount or greater.

19. The control device according to claim 1 or 18, wherein the parameter includes a gradient of a road traveled by the human-powered vehicle.

\* \* \* \* \*